United States Patent Office 3,357,737
Patented Dec. 12, 1967

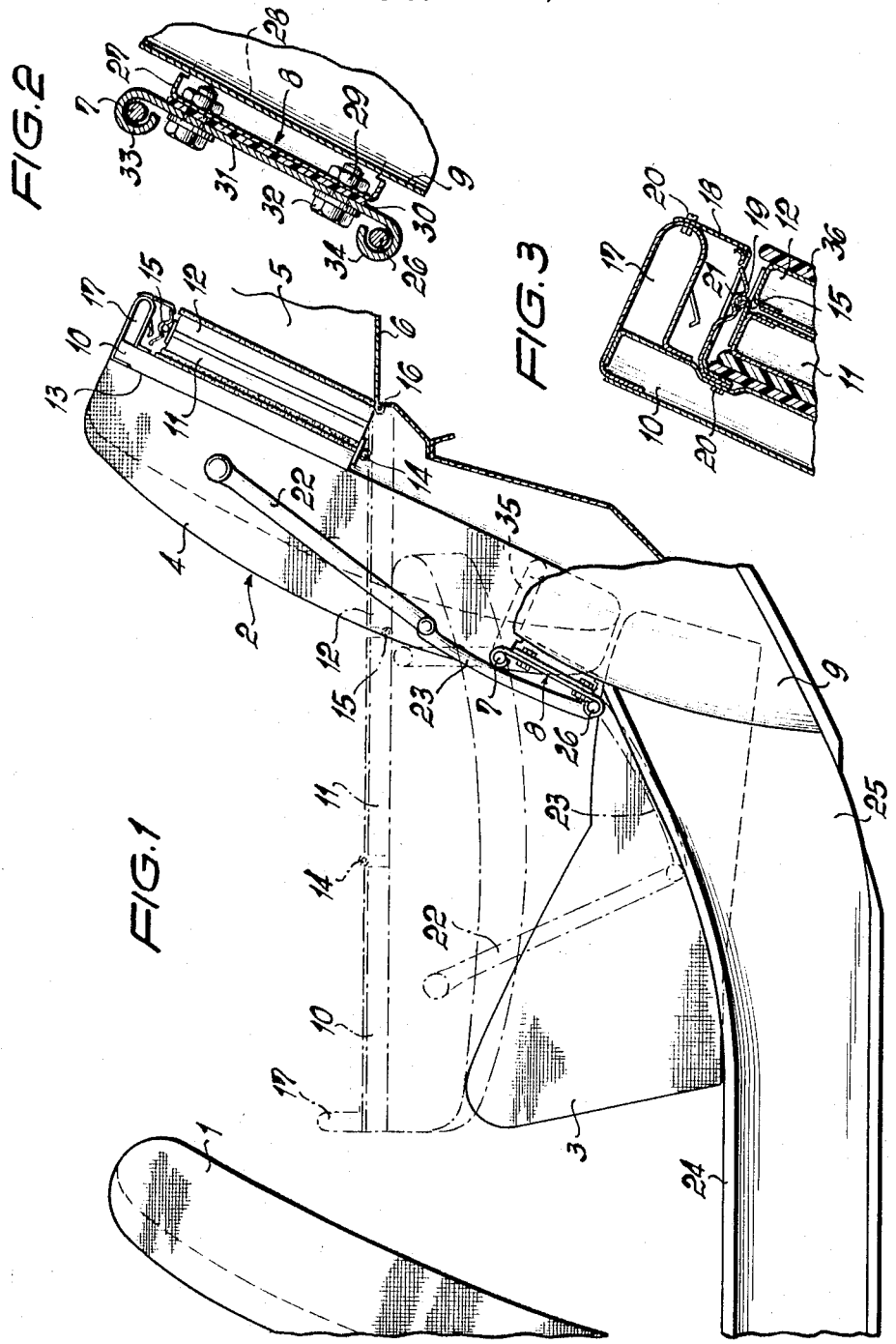

3,357,737
MOTOR VEHICLE, ESPECIALLY PASSENGER
MOTOR VEHICLE
Karl Vettel, Ludwigsburg-Hoheneck, and Gerhard Burk, Magstadt, Germany, assignors to Firma Dr. Ing. h.c. F. Porsche K.G., Stuttgart-Zuffenhausen, Germany
Filed Jan. 28, 1966, Ser. No. 523,674
Claims priority, application Germany, Feb. 11, 1965, P 36,045
10 Claims. (Cl. 296—66)

ABSTRACT OF THE DISCLOSURE

The present disclosure relates to a passenger motor vehicle having a loading surface provided to the rear of the rear seats, which is adapted to be extended by pivoting movement of the rear seat backrest into a horizontal position and the corresponding pivoting of extension parts pivoted to each other, to the backrest and to the loading surface. In the normal position of the backrest, the extension parts are folded together and hold the backrest in its normal position by inter-engaging with a spring lock held by a rearwardly extending bulge on the top of the backrest covering the top of the folded extension parts and forming an upright loading abutment when the backrest is in its horizontal position. Reinforcements are provided for moving into engagement with the extension parts when the backrest is pivoted into its horizontal position.

---

It is already known in the prior art with a two-door passenger motor vehicle having two seat rows to construct, for purposes of increasing the luggage space provided to the rear of the rear seats, the backrest of the rear seats so as to pivot forwardly. Floor parts adapted to be folded together are secured at the rear wall of the backrest which are folded apart with a pivoted backrest and form a loading platform. The loading platform is supported on brackets secured at the luggage floor and is simultaneously retained by the same in its position. This construction of the backrest, however, requires special measures and means in the construction of the pivot joints for the backrest whose handling is difficult and complicated. By combining the backrest with the entire loading platform, the backrest becomes heavy. The loading platform has to be spread out and secured or fastened subsequently. Since its fastening means are not directly accessible but only by way of the loading platform, additional actuations and manipulations are necessary. A special guide means for the backrest is additionally provided in order to prevent a canting or tilting thereof during the pivoting movement.

The aim underlying the present invention essentially consists in creating a backrest adapted to be handled easily which, inter alia, is pivotally supported in simple hinges, cannot tilt or cant during pivoting thereof, and in which the formation of the loading-platform extension does not require an excessive amount of work.

This is achieved in accordance with the present invention in that the extension parts for the loading platform are form-lockingly connected with the backrest of the rear seats and with the loading surface of the body. As a result of the connection of the extension parts in accordance with the present invention, the pivot hinges of the backrest are relieved and a tilting or canting of the backrest is avoided. The pivot hinges can thus be constructed in a relatively uncomplicated manner. The handling of the backrest for purposes of forming the extension of the loading platform is simple, requires relatively little force, and consists essentially only in pivoting the backrest. Additionally, by the arrangement and construction of the parts in accordance with the present invention, the space available can be utilized in an optimum manner insofar as the backrest during pivoting thereof is displaced in the direction toward the front seats whereby the resulting spacing between backrest and fixed loading surface is bridged by the extension parts.

One of the extension parts is constituted by a section of the backrest of the rear seats or by a wall part secured at the backrest whereby the remaining extension parts are connected with each other and with the backrest or the wall part as well as the loading surface of the body by hinges. With a backrest consisting of several parts, provision is made that the backrest sections are connected with the extension parts independently of one another. In the normal position of the backrest, the extension parts abut, folded together, at the backrest and are covered by a projecting bulge at the backrest. The extension parts are thereby accommodated in a space-saving manner and thereby forcibly fold together or apart corresponding to the movement of the backrest. The scuring of the backrest in its normal position is realized by a locking device secured at the backrest and cooperating with the extension parts.

The locking device includes one or several springs which cooperate with the extension parts. A springy or resilient band is thereby secured at the backrest below the bulge which has a section of undulated construction that cooperates with the hinge connecting the extension parts. In order to increase the loadability of the loading platform, especially of the section thereof constituted by the backrest, it is additionally provided in accordance with the present invention that possibly at both sides of the backrest one lever each is pivotally connected to the backrest which, with a backrest pivoted into the horizontal position, effectuate a support thereof at a fixed body part. An intermediate lever is coordinated to each of the support levers which abuts with a pivoted backrest on a body or frame part.

Furthermore, a reinforcement for supporting the extension parts with a pivoted backrest is accommodated preferably within the backrest. The reinforcement consists of an essentially U-shaped, bow-type member whose cranked ends are provided with one pin each as pivot bearing for the backrest. The support of the pin as well as of the intermediate lever at fixed parts of the vehicle takes place in an advantageous manner by a common hinge plate.

Accordingly, it is an object of the present invention to provide a motor vehicle, especially passenger motor vehicle, in which the backrest of the rear seat can be pivoted forwardly to extend the useful loading surface and which avoids by extemely simple means the aforementioned shortcomings and drawbacks encountered with the prior art constructions.

Another object of the present invention resides in a backrest construction for the rear seats of passenger motor vehicles, adapted to be pivoted forwardly to extend the useful loading platform, which can be handled easily and in a relatively uncomplicated manner and which requires no special measures to realize the loading platform extension.

A further object of the present invention resides in a motor vehicle having a pivotal backrest for the rear seats adapted to be pivoted forwardly for purposes of extending the useful loading surface of the luggage space which permits fully automatic operation of the extension of the loading platform by the mere pivotal movement of the backrest.

Still another object of the present invention resides in a backrest construction for the rear seats of a motor vehicle which is adapted to be pivoted forwardly to extend the loading surface of the luggage space but which does not require any special guide means or support means to prevent a tilting thereof during the pivoting movement.

Still a further object of the present invention resides in a backrest for the rear seat of a passenger motor vehicle which is pivotally supported by simple hinges to permit pivotal movement for purposes of extending the loading surface of the luggage space yet requires no undue amount of work to produce such changeover.

A still further object of the present invention resides in a backrest for motor vehicles adapted to be pivoted for purposes of extending the loading surface of the luggage space which permits optimum utilization of the space available by displacing the backrest in the direction toward the front seats during the pivot movement thereof.

Another object of the present invention resides in a pivotal rear seat backrest combined with means for extending the loading surface of the luggage floor which requires relatively little space, can be actuated by simply pivoting the backrest, yet permits relatively high loads to be placed on the surface extension without complicated structural parts that need complicated manipulation.

These and further objects, features, and advantages of the present invention will become more obvious from the following description when taken in connection with the accompanying drawing which shows, for purposes of illustration only, one embodiment in accordance with the present invention, and wherein:

FIGURE 1 is a schematic side elevational view of a motor vehicle seat in accordance with the present invention together with the adjacent parts of the vehicle; and FIGURES 2 and 3 are partial cross-sectional views, on an enlarged scale, and illustrating certain details of the seat of FIGURE 1.

Referring now to the drawing wherein like reference numerals are used throughout the various views to designate like parts, the seating installation of a motor vehicle illustrated in FIGURE 1 comprises a front seat or seat bench 1, of which only a portion of the backrest is shown in the drawing, and a rear seat bench generally designated by reference numeral 2. The seat bench 2 includes a seat cushion 3 and a unitary or multi-partite backrest 4. A storage or luggage space 5 is provided to the rear of the seat bench 2 whose floor 6 is constituted by a stamping of the underframe of the motor vehicle.

The luggage floor 6 is adapted to be extended by the backrest 4 of the rear seat bench 2. The backrest 4 is thereby constructed pivotally about a pin 7 (FIGS. 1 and 2) whereby the pin 7 is guided in a support means generally designated by reference numeral 8. The support means 8 is secured laterally of the backrest 4 at the vehicle body of the motor vehicle, for example, at an inner wheel casing wall 9. The position of the pin 7 relative to the backrest 4 is so chosen that during pivoting of the backrest 4 toward the seat cushion 3, the backrest is displaced in the direction toward the front seat 1 whereby the extension of the loading surface realized by the backrest 4 is larger than corresponds to the length of the backrest.

In order to bridge the free space between the backrest 4, while in the horizontal position, and the luggage floor 6, as well as to create a parallel guidance of the backrest 4, the latter is form-lockingly connected with the luggage floor 6. This connection is established by form-rigid parts, for example, plates 10, 11 and 12 or the like pivotally connected with each other (FIGS. 1 and 3). The plate 10 is rigidly secured at the rear wall 13 of the backrest 4. The plate 10 is connected with the plate 11 by hinge bearings or a hinge band 14 and the plate 12 is pivotally connected by means of hinge bands 15 and 16 with the plate 11 and the luggage floor 6, respectively.

During pivoting of the backrest 4 out of its normal position into the horizontal position, the plates 10, 11, and 12 are forcibly folded apart. The end position of the pivoted backrest 4 as well as the position of the parts connected therewith is indicated in FIGURE 1 in dash and dot line. By further pressing down, for example, the plate 11 beyond its extended position, the plates 10, 11, and 12 as well as the backrest 4 are fixed and clamped in the horizontal position thereof. By lifting the plate 11, the clamping is released and while pivoting back the backrest 4 into the normal position, the plates 10, 11, and 12 again fold together.

The plates 10, 11, and 12 are covered in the normal rest position thereof by a strip or bar 17 which is rigidly connected with the backrest 4. The bar 17 serves simultaneously as handle bar for the handling of the backrest 4. A housing 18 is secured at the bar 17 (FIG. 3). A securing means for the plates 10, 11 and 12 and therewith simultaneously for the backrest 4 is provided below the bar 17 which are held fast in the normal position by the securing means.

The securing means consists of a bow-shaped spring 19 which is secured together with the housing 18 by means of bolts or screws 20 at the plate 10 of the backrest. The bow-shaped spring 19 is provided with a section 21 of undulated construction which, in the normal position of the plate, partly surrounds the hinge 15 and resiliently holds the same fast.

A linkage consisting of levers 22 and 23 is secured, on the one hand, at the backrest 4 and, on the other, at the support means 8. During pivoting of the backrest 4, the lever 23 comes into abutment against the top surface 24 of a lateral longitudinal bearer 25 of the underframe of the motor vehicle whereas the backrest 4 is supported at the longitudinal bearer by way of the lever 22.

The support means 8 for the pivot pin 7 of the backrest 4 as well as for a pin 26 of the lever 23 consists of a securing body 27 constructed as stamping whose rim flanges 28 are secured at the wheel casing wall 9 by means of spot welding. Nuts 29 are welded to the securing body 27. A bow-shaped member 31 abuts under interposition of an insert 30 at the body 27 which is retained in its position by bolts 32. The ends of the bow-shaped member 31 are constructed in an eye-like manner and form the bearing eyes 33 and 34 for the accommodation of the pins 7 and 26.

The pin 7 is possibly made in one piece with a U-shaped bow member 35 which extends within the backrest 4 over the entire width thereof. The bow-shaped member 35 is arranged in such a manner that with a pivoted backrest 4, it forms a support for the plate 11 of the extension of the loading platform. A considerable increase of the loadability of the loading platform extending beyond the luggage floor 6 and constituted in conjunction with the plates 10, 11 and 12 is achieved in an extremely simple manner by this measure in combination with the levers 22 and 23. In order to avoid a slipping of the loaded objects, the plates 10, 11, and 12 are provided with a cover 36 of any suitable material such as felt, rubber, plastic material, or the like.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A motor vehicle, especially a passenger motor vehicle, having a loading surface formed by vehicle body parts and provided to the rear of the rear seats, comprising: a rear seat backrest; means for selectively extending the loading surface including pivot means supporting siad backrest for pivotal movement into a substantially horizontal loading position, extension parts for the loading surface, and connecting means form-lockingly connecting the extension parts with said backrest means as well as with the body parts forming the loading surface; said extension parts abutting against the rear of said backrest folded together in the normal position of said backrest; said backrest having rearwardly projecting bulge means for covering the top of said extension parts in the normal position of said backrest, said backrest including locking means mounted beneath said bulge means for engaging said extension parts and holding said backrest in its normal position; said bulge means extending upwardly in the horizontal loading position of said backrest to provide a forward loading abutment and handle for moving the backrest between its positions.

2. The device of claim 1, wherein said backrest is of a multi-partite construction having a plurality of separate passenger sections connected with corresponding extension parts independently of one another for independent pivoting between the loading position and the normal position.

3. The device of claim 1, wherein said extension parts include hinge means pivotally connecting at least two of said extension parts together; said locking means including at least one springy band secured below the bulge means and having a section of undulated shape interengaging with said hinge means connecting the extension parts.

4. The device of claim 3, including a first lever pivotally connected at one end to said backrest; a second lever pivotally connected at one end to the vehicle body and pivotally connected at its other end to the other end of said first lever; relatively fixed body abutment means for engaging and supporting the adjacent pivoted ends of said first and second levers when said backrest is in its horizontal loading position for firmly supporting said backrest.

5. The device of claim 4, including bracket means pivotally mounted for movement with said backrest between a retracted position corresponding to the normal position of said backrest and an extended position corresponding to the loading position of said backrest for engaging beneath said extension parts and vertically supporting said extension parts.

6. The device of claim 5, wherein said bracket means is a U-shaped member pivotally mounted to a stationary portion of the vehicle; said backrest pivot means, said first and second levers, and said extension parts providing the sole supporting connection between said backrest and the remaining fixed parts of the vehicle; said extension parts consisting of a plurality of plates serially permanently pivotally connected together between said backrest and said loading surface body parts.

7. A motor vehicle, especially a passenger motor vehicle, having a loading surface formed by vehicle body parts and provided to the rear of the rear seats, comprising: a rear seat backrest; means for selectively extending the loading surface including pivot means supporting said backrest for pivotal movement from a normal position into a substantially horizontal loading position, extension parts for the loading surface, and connecting means formlockingly connecting the extension parts with said backrest means as well as with the body parts forming the loading surface; reinforcing bracket means mounted for pivotal movement within said backrest between a retracted position corresponding to the normal position of said backrest and an extended position corresponding to the loading position of said backrest for engagement with the entire transverse under surface of said extension parts to vertically support said extension parts.

8. The device of claim 7, wherein said bracket means includes at least one U-shaped bow member having one leg for engaging said extension parts and the other leg forming the pivot shaft of said backrest pivot means.

9. The device of claim 8, including a first lever pivotally connected at one end to said backrest; a second lever pivotally connected at one end to the vehicle body and pivotally connected at its other end to the other end of said first lever; relatively fixed body abutment means for engaging and supporting the adjacent pivoted ends of said first and second levers when said backrest is in its horizontal loading position for firmly supporting said backrest.

10. The device of claim 9, wherein said bracket means is a U-shaped member pivotally mounted to a stationary portion of the vehicle; said backrest pivot means, said first and second levers, and said extension parts providing the sole supporting connection between said backrest and the remaining fixed parts of the vehicle; said extension parts consisting of a plurality of plates serially permanently pivotally connected together between said backrest and said loading surface body parts.

References Cited

UNITED STATES PATENTS

| | | | |
|---|---|---|---|
| 2,916,325 | 12/1959 | Estes et al. | 296—66 |
| 2,956,837 | 10/1960 | Koplin | 296—66 |
| 2,997,335 | 8/1961 | May | 296—66 |
| 3,011,822 | 12/1961 | May et al. | 296—66 |
| 3,013,838 | 12/1961 | Semar et al. | 296—66 |

FOREIGN PATENTS

| | | |
|---|---|---|
| 928,506 | 6/1955 | Germany. |

BENJAMIN HERSH, *Primary Examiner.*

J. H. BRANNEN, L. D. MORRIS, *Assistant Examiners.*